Feb. 28, 1933.  R. BISHOP  1,899,663
GEARING FOR STEERING MECHANICALLY PROPELLED
VEHICLES AND FOR OTHER PURPOSES
Filed Nov. 7, 1930
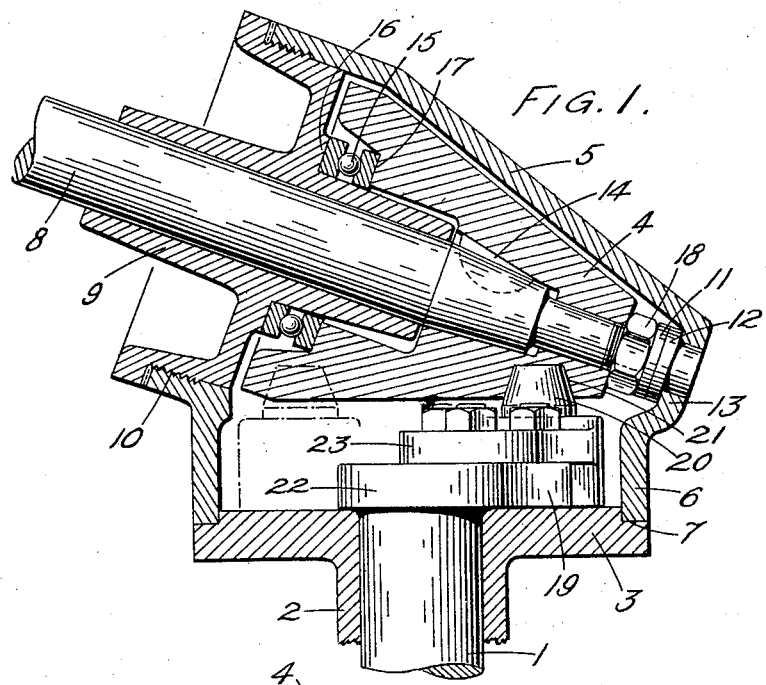
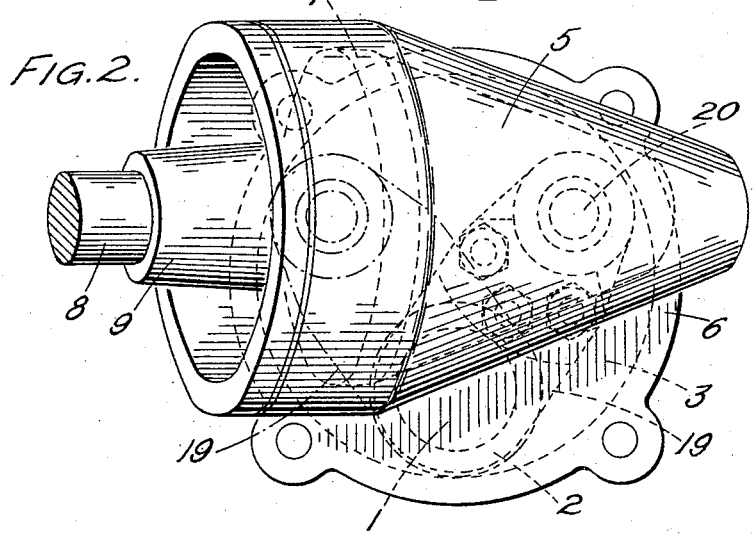
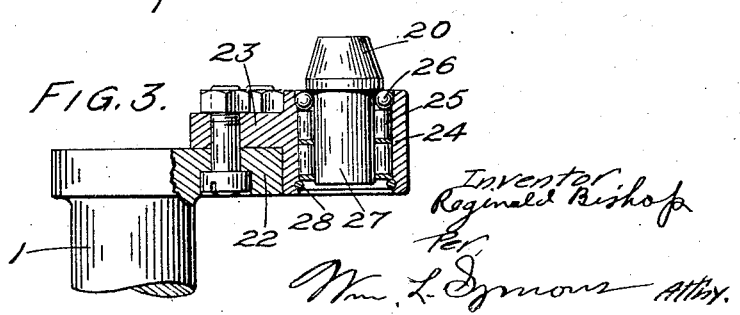
Inventor
Reginald Bishop
per
Wm. L. Symons Atty.

Patented Feb. 28, 1933

1,899,663

UNITED STATES PATENT OFFICE

REGINALD BISHOP, OF LONDON, ENGLAND

GEARING FOR STEERING MECHANICALLY PROPELLED VEHICLES AND FOR OTHER PURPOSES

Application filed November 7, 1930, Serial No. 494,162, and in Great Britain November 8, 1929.

This invention relates to gearing that is particularly, though not exclusively, applicable to the steering of mechanically propelled road vehicles. Thus the invention may be employed, for example, for the control of the throttle of internal combustion engines or of the time of ignition of the explosive charges of said engines or for other purposes, such as the steering of boats.

The invention is a modification of the invention described in the specification of prior Letters Patent No. 1,673,488 granted to the applicant herein. The gearing described in said prior specification comprises a cam approximating a worm of constant diameter which is engaged by a pin or roller mounted on an arm that is angularly movable in a plane parallel to the longitudinal axis of the cam, said arm being mounted on a rocker shaft and the axes of the arm and of the pin or roller being at right angles and the cam being produced by subjecting the cam blank to the action of a fixed tool whose operative edge or face is at the same angle as the face of the roller, the cam blank being rotated about its axis and at the same time moved in the arc of a circle whose radius is equal to the length of the roller carrying arm between the centre of the rocker shaft and the axis of rotation of the roller, this movement being effected without any change in direction of the longitudinal axis of the cam blank. The cam may be produced by rotating the cam blank and at the same time moving the tool in relation thereto.

According to the present invention gearing comprises a conical member having a cam groove of worm form in its surface and a member, for example, a roller, engaging said cam groove and mounted on an arm carried on a rocker shaft so as to be angularly movable in a plane parallel to the side of the conical member, the axes of the arm and the member mounted thereon being at right angles and the cam groove being produced by subjecting the cam blank to the action of a tool fixed in position whose operative edge or face is at the same angle as the face of the member, the cam blank being rotated about its axis and at the same time moved in the arc of a circle whose radius is equal to the length of the arm between the centre of the rocker shaft and the member, for example, the axis of the roller, this movement being effected without any change in direction of the longitudinal axis of the cam blank.

In a modification of the invention the cam groove is produced by rotating the cam blank about its axis and at the same time moving the tool in relation thereto without change in the direction of the axis of the tool in the arc of a circle whose radius is equal to the length of the arm between the centre of the rocker shaft and the member, for example, the axis of the roller.

One form of the invention as applied to the steering gear of a road vehicle will now be described by way of example, with reference to the accompanying drawing wherein:—

Fig. 1 shows an elevation partly in section,
Fig. 2 a plan, and
Fig. 3 a detail, partly in section, of the rocker shaft, arm and roller.

1 is the rocker shaft which is vertical and is carried in a tubular bearing having at its outer end an eccentrically disposed platform 3. A housing for the conical gear member 4 is bolted to said platform 3, the housing having an upper wall 5 of conical shape surrounding the conical member and a depending circular wall 6 which engages a shoulder 7 on the upper surface of the platform 3. The steering column 8 is supported in a bearing 9 which is screwed at 10 into the larger end of the conical housing 5 and the end of the steering column carries a hardened steel thrust member 11 which engages a similar member 12 carried at the smaller end 13 of the housing. The conical gear member 4 is keyed to the steering column 8, 14 being the key, and preferably a ball thrust bearing 15 is provided between the outer wall 16 of the bearing 9 for the steering column and the end 17 of the conical gear member. The conical gear member is forced on to the steering column by a nut 18 engaging the threaded end of the column.

The bearing 2 for the vertical rocker shaft or the housing is mounted on the car frame or the dash board and the arrangement is such that the bearing for the rocker shaft may be easily moved away from the housing. An arm 19 extends from the rocker shaft 1 and carries at its end a projection or a roller 20 which engages the cam groove 21 in the conical member 4. Many forms of mounting of the roller 20 may be employed and the arm may be integral with the rocker shaft or may be separate therefrom and bolted thereto. In the form shown in the drawing the arm is in two parts, a part 22 integral with the rocker shaft and a part 23 bolted thereto. The part 23 at its outer end is tubular as shown at 24 and constitutes a housing for the rollers 25 and balls 26 forming the bearing for a pin 27 having the roller 20 at its outer end. 28 is a spring accommodated in a groove in the housing 24 and which secures the rollers in place. The arm 19 is disposed in the space between the housing 5 and the eccentrically arranged platform 3 at the top of the bearing 2.

With gearing according to the present invention the depth of the cam groove 21 in the conical gear member varies to enable it to co-operate with the member, such as a pin or roller 20, at all times and without lost motion. The mounting of the roller directly on the arm 19 and carrying the arm beyond the longitudinal axis of the conical member (as shown in Fig. 2) permits a larger range of movement and at the same time has greater length when considered as a lever in comparison with the usual worm and sector or worm and nut mechanism of the same size, whereby working pressures are reduced and plain bearings may be used. The mechanism is compact, easily assembled and contained in a casing of small dimensions.

The axis of the roller 20 when moving towards one end of the cam from a position in which the plane through its carrying arm and the rocker shaft is at right angles to a plane through the longitudinal axis of the cam, may move in a path that passes from one side to the other of said plane.

The pitch of the cam groove may be constant or may vary towards one or both ends.

What I claim is:—

1. Gearing, comprising a rotatable shaft, a rock shaft disposed in angular relation to the rotatable shaft, a member mounted on said rotatable shaft having a grooved conical wall, and a crank member carried by said rock shaft and operatively engaged in the groove in the conical wall of said member, said groove being of graduated depth to compensate for the travel of the crank pin relative to the grooved conical member whereby intimate working contact between the pin and grooved conical wall is maintained.

2. Gearing comprising a conical member having a cam groove of worm form in its surface, a follower engaging said cam groove, an arm on which said follower is mounted and a rocker shaft carrying said arm, said follower being angularly movable in a plane parallel to the side of the conical member to which it is adjacent, the axes of the arm and the follower being at right angles and the cam groove being of a form generated in the conical member by a fixed generatrix located at the same angle as the face of the follower by rotating the conical member about its axis and at the same time moving it in the arc of a circle whose radius is equal to the length of the arm between the centre of the rocker shaft and the axis of the follower, this movement being effected without any change in direction of the longitudinal axis of the conical member.

3. Gearing comprising a conical member having a cam groove of worm form in its surface, a rocker shaft, an arm mounted on the rocker shaft to move in a plane parallel to the side of the conical member to which it is adjacent and a follower mounted on the arm with its axis at right angles to the axis of the arm and engaging the cam groove, the cam groove being of a form generated in the conical member by a generatrix located at the same angle as the face of the follower by rotating the conical member about its axis and at the same time moving one of said components (i. e. the generatrix and conical member) relatively to the other in the arc of a circle whose radius is equal to the effective length of the arm without any change in the direction of the longitudinal axis of said one component, the axis of the follower, when moved towards one or other end of the cam from a position in which the plane through its carrying arm and the rocker shaft is at right angles to a plane through the longitudinal axis of the cam member, moving in a path that passes from one side to the other of said plane through the longitudinal axis of the cam member.

4. Gearing comprising a conical member having a cam groove of worm form in its surface, a rocker shaft, an arm mounted on the rocker shaft to move in a plane parallel to the side of the conical member to which it is adjacent and a follower mounted on the arm with its axis at right angles to the axis of the arm and engaging the cam groove, the cam groove being of a form generated in the conical member by a generatrix located at the same angle as the face of the follower by rotating the conical member about its axis and at the same time moving one of said components (i. e. the generatrix and conical member) relatively to the other in the arc of a circle whose radius is equal to the effective length of the arm without any change in direction of the longitudinal axis of said one component, the axis of the rocker shaft being substantially vertical.

5. Gearing comprising a conical member having a cam groove of worm form in its surface, a rocker shaft, an arm mounted on the rocker shaft to move in a plane parallel to the side of the conical member to which it is adjacent and a follower mounted on the arm with its axis at right angles to the axis of the arm and engaging the cam groove, the cam groove being of a form generated in the conical member by a generatrix located at the same angle as the face of the follower by rotating the conical member about its axis and at the same time moving one of said components (i. e. the generatrix and conical member) relatively to the other in the arc of a circle whose radius is equal to the effective length of the arm without any change in direction of the longitudinal axis of said one component, a tubular bearing in which the rocker shaft is carried, a platform at the outer end of said bearing and a housing secured to the platform, in which housing the conical cam member and the shaft on which it is mounted are carried.

6. Gearing according to claim 5, wherein the shaft on which the conical cam member is mounted is supported in a bearing secured in an end of the housing.

7. Gearing comprising a conical member having a cam groove of worm form in its surface, a follower engaging said cam groove, an arm on which said follower is mounted and a rocker shaft carrying said arm, said follower being angularly movable in a plane parallel to the side of the conical member to which it is adjacent, the axes of the arm and the follower being at right angles and the cam groove being of a form generated in the conical member by a generatrix located at the same angle as the face of the follower by rotating the conical member about its axis and at the same time moving the generatrix in relation thereto without change in the direction of said generatrix in the arc of a circle whose radius is equal to the length of the arm between the centre of the rocker shaft and the axis of the follower.

Dated this 28th day of October, 1930.

REGINALD BISHOP.